United States Patent [19]

Heckenbleikner

[11] 4,455,999

[45] Jun. 26, 1984

[54] SOLAR HOT-WATER HEATERS

[76] Inventor: Ingenuin Heckenbleikner, West Cornwall, Conn. 06796

[21] Appl. No.: 285,421

[22] Filed: Jul. 20, 1981

[51] Int. Cl.³ .............................................. F24J 3/02
[52] U.S. Cl. .................................... 126/445; 126/444; 126/429; 126/449
[58] Field of Search ............... 126/429, 444, 445, 449, 126/448

[56] References Cited

U.S. PATENT DOCUMENTS

| | | | |
|---|---|---|---|
| 3,215,134 | 11/1965 | Thomason | 126/444 |
| 4,046,133 | 9/1977 | Cook | 126/429 |
| 4,089,324 | 5/1978 | Tjaden | 126/445 |
| 4,096,861 | 6/1978 | Bowles | 126/444 |
| 4,186,726 | 2/1980 | Spencer | 126/444 |
| 4,266,531 | 5/1981 | Behrendt et al. | 126/449 |
| 4,290,414 | 9/1981 | Sharp | 126/448 |
| 4,292,955 | 10/1981 | Smith | 126/444 |
| 4,319,559 | 3/1982 | Hermann et al. | 126/449 |

Primary Examiner—Samuel Scott
Assistant Examiner—Noah Kamen
Attorney, Agent, or Firm—Cushman, Darby & Cushman

[57] ABSTRACT

A solar energy collection system including a collector having an absorber structure in the form of a closed chamber defined between an upper sheet comprised of a thin metal sheet or foil and an under layer. The under layer includes a plurality of supports that extend upwardly to provide support for the upper sheet and define flow paths for the heat exchange medium. The support can be in the form of a plurality of protuberances around which the heat transfer medium can pass or a plurality of ribs that extend across the width of the collector to define flow paths for the transfer medium between them. If ribs are used, grooves can also be placed across the flow paths to effect some degree of turbulence to the flowing medium. The medium is directed to and collected from the absorber through a header arrangement provided on each side of the absorber. The collection system also includes a storage device and medium circulation means to circulate the heat exchange medium through the system at temperatures above a predetermined minimum.

12 Claims, 4 Drawing Figures

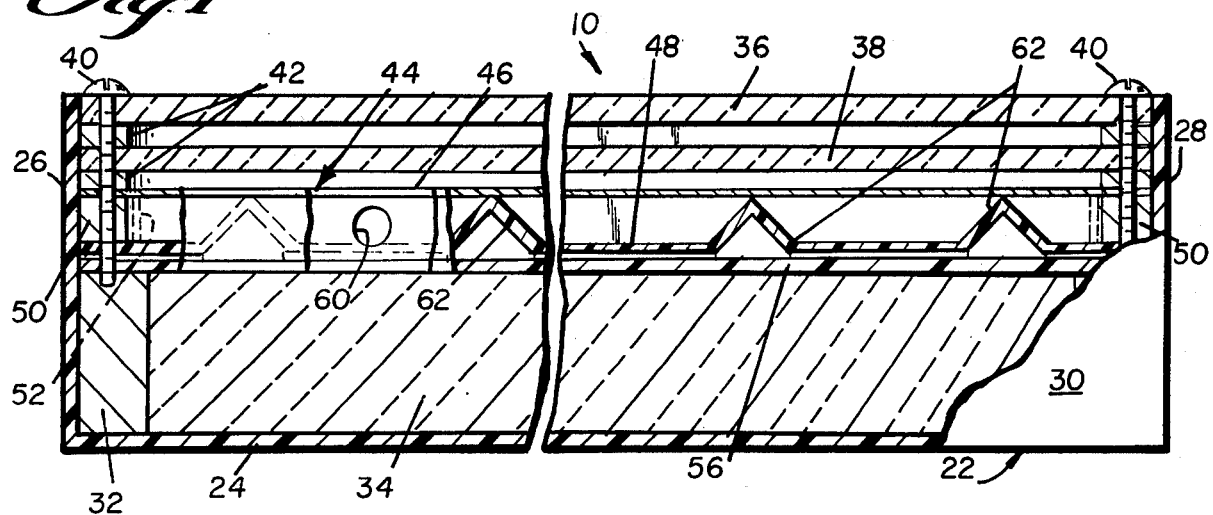
Fig. 1
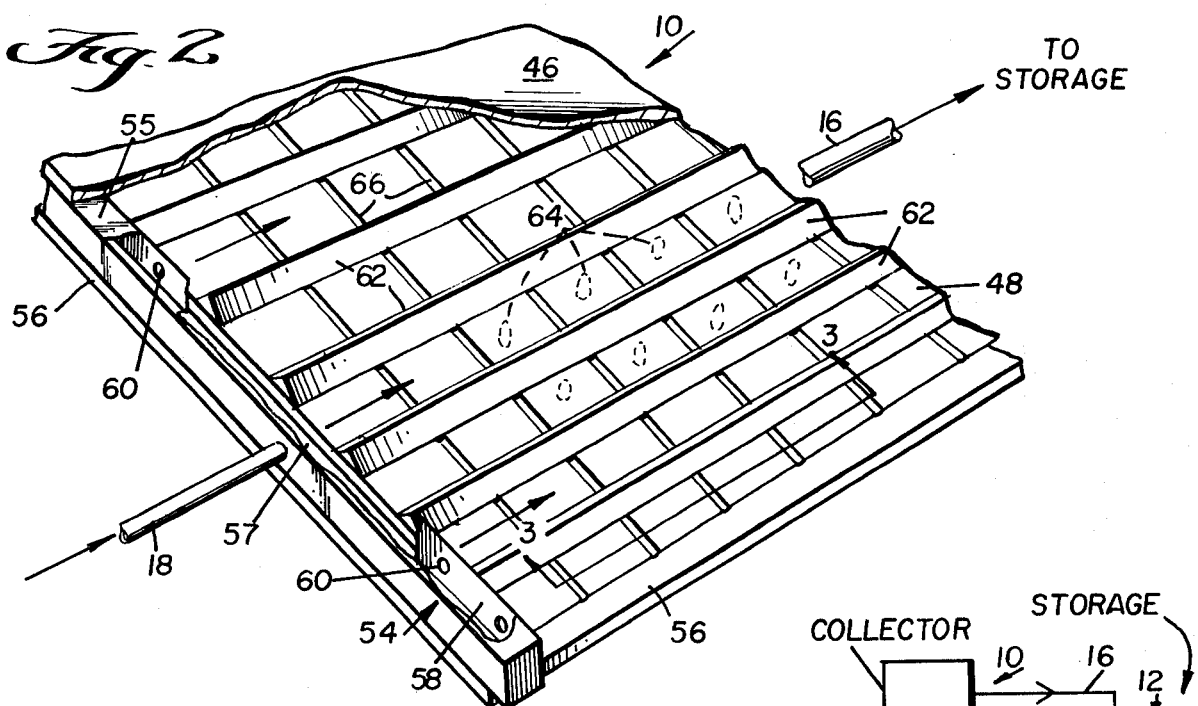
Fig. 2
Fig. 3
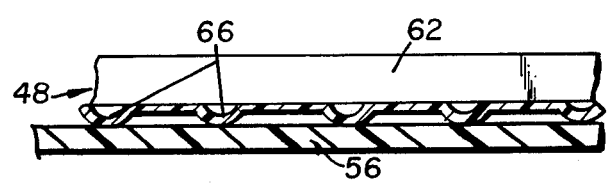
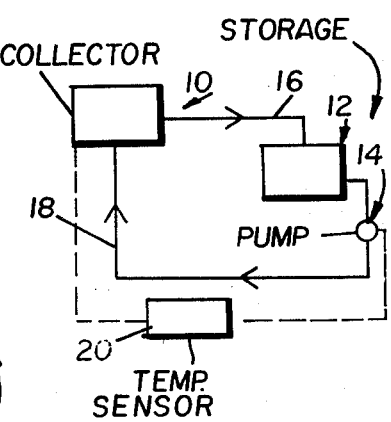
Fig. 4

SOLAR HOT-WATER HEATERS

FIELD OF THE INVENTION

This invention relates to solar collectors and in particular to an improved absorption structure therefor.

BACKGROUND OF THE PRESENT INVENTION

A wide variety of types of solar collectors are known. Some of these include absorber plates with areas defined therebelow through which a transfer medium can be passed. Exemplary of this type of arrangement which includes a type of chamber structure are Safdari, U.S. Pat. No. 4,019,494; Stephens, U.S. Pat. No. 4,114,599 and Banet, U.S. Pat. No. 4,076,024. Safdari employs a blackened absorber plate that is provided with fins attached to its bottom surface. The plate and the fins are both spaced above a layer of insulation and defined an air space and it is alleged that the fins help improve the transfer to the air passing through the space defined between the absorber plate and the insulation layer. In Stephens, plastic sheets are connected together and serve to define a passageway through which water is pumped with the passageway including flow plates or baffles staggered throughout the area between the two plates so that water is forced to flow around them. In Banet, a closed liquid chamber is formed with the upper plate having a plurality of parallel, shallow grooves projecting downward toward the interior of the chamber and at spaced apart intervals the bottom plate is bonded to those shallow grooves by forming an upwardly extending recess in the bottom sheet which will meet the bottom of that shallow groove.

Other known collector structures employ a plurality of paths through which a transfer medium can flow with the pathways including baffle devices such as is shown in Skrivseth, U.S. Pat. No. 4,099,513 and Yu, U.S. Pat. No. 4,154,222.

In addition, other types of methods for helping dissipate heat energy being collected by an absorber plate are shown in Guertin, U.S. Pat. No. 4,114,593; Taylor, U.S. Pat. No. 4,016,861 and Schoenfelder, U.S. Pat. No. 3,863,621.

SUMMARY OF THE PRESENT INVENTION

The present invention relates to an improved collector structure that employs an absorber portion that is structurally different from these known prior art devices and which produces very efficient results with respect to energy transfer. The collector is housed in an outer casing having side and end walls with insulation being provided about the side and end walls and across the entire bottom surface of the collector structure. The absorption assembly is positioned above and within this insulation and above and within this insulation and above the collector structure are one or two layers of glass or other transparent material. The absorber assembly is closed, on its sides by the insulation, depending upon the type being used or by plates. The absorber is comprised of a thin, upper sheet of metal, the exterior surface being black or dark green to improve its energy absorption capabilities. The absorber also includes a lower support sheet and a closed chamber is defined between the upper and lower sheets and the lower sheet can be provided with a plurality of protuberances or ribs for supporting the upper sheet and for also defining a flow path for the absorber fluid that will move or flow within the closed chamber. If protuberances are used, they can be staggered so as to produce turbulence in the absorbing fluid flow to improve the heat exchange contact between the absorbing fluid or transfer medium and the bottom surface of the absorber sheet.

The absorber assembly, if it includes a plurality of spaced apart ribs as a support means formed in the lower sheet, will have flow paths defined along the length of those support ribs which preferably extend across the width of the collector; that is, from one side to the other. In order to improve the transfer of energy, I have found it desirable to employ shallow grooves that extend perpendicularly to the flow path along the ribs so that some degree of turbulence will be created within the transfer medium flowing along its defined path.

The height of the protuberances or support ribs is very small and the thickness of the absorber plate is likewise extremely thin. Accordingly, it is believed that a great amount of heat exchange will occur between the absorber plate and the transfer medium making the absorption assembly extremely efficient.

I prefer to employ a temperature sensor to sense when collection temperatures are desirable. Above that temperature, the pump would circulate transfer medium through the system and below that temperature, transfer medium would not be circulated, but would fall, by gravity, back to the storage area.

Other objects, features, and characteristics of the present invention as well as the methods and operation and functions of the related elements of the structure, and to the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

FIG. 1 is a diagrammatic, partial, cross-sectional view showing the cross-sectional structure of the present collector assembly;

FIG. 2 is a diagrammatic, partial, perspective view of the collector structure from which portions have been cut away for clarity;

FIG. 3 is diagrammatic, cross-sectional view taken along line 3—3 in FIG. 2;

FIG. 4 is diagram of the collector system incorporating the collector structure according to the present invention.

DETAILED DESCRIPTION OF THE PREFERRED EXEMPLARY EMBODIMENT OF THE PRESENT INVENTION

Turning now to the drawings and with reference first to FIG. 4, the collectors, generally indicated at 10, and as included in a system together with a storage device 12, a pump 14 for circulating a transfer medium such as a water or water and glycol mixture through the system via a return line 16 connecting the collector to the storage device and an output line 18 connecting the storage device via pump 14 to the input side of collector 10. In order to assure that freeze ups do not occur during winter or colder mouths, temperature control means are preferably included to control the operation of pump 14 so that, perferably, pump 14 would not circulate the transfer medium through the system when temperatures fell below a predetermined temperature level, such as, for example, 40 degrees Fahrenheit.

For example, the temperature control means can include two temperature sensors 19 and 21 associated with the collector 10 and the other with storage 12, respectively, and a temperature comparator 20 for controlling activator of pump 14 whenever the collector temperature sensed by sensor 19 was greater than the storage temperature.

Turning our attention next to FIGS. 1 and 2, the collector 10 is housed in an outer casing generally indicated at 22 comprised of a bottom wall 24, end walls 26 and 28 and side walls, one of which is shown at 30. Insulation layers 32 are provided to insulate along the end and side walls whereas a bottom insulation layer 34 extends across bottom 24 of the housing 22, inside the side and wall insulations 32 to provide insulation across the major extent of the collector's bottom surface. Insulation layers 32 and 34 can be comprised of any convenient insulating materials such as a foam or glass batting type of material. It only being necessary to insure proper insulation to maintain the efficiency of the collector.

The top of the structure is enclosed by one or two transparent sheets such as are indicated at 36 and 38 which can be glass, plastic or any other suitable transparent material. These are held in place by screws indicated at 40 and to assure proper insulation, insulating spacers 42 are inserted between each of the transparent sheets 37 and 38 and between bottom sheet 38 and the absorber assembly generally indicated at 44.

With reference to FIGS. 1 and 2, absorber assembly 44 is comprised of a thin top metal sheet 46. This sheet is preferably thin and can range, for example, from about 1/64th inch thick to about ⅛th inch thick. While a variety of types of metals could be used, it is preferred to use an extremely thin sheet as the upper sheet 46. The extreme thinness of the sheet would allow metals such as steel or copper to be used but regardless of the metal being employed, its exterior surface, facing glass sheets 36 and 38 should be painted black, dark green or some other dark color that will improve absorbency of solar energy.

Absorber 44 also includes a bottom sheet 48, preferably comprised of a plastic material to which the upper sheet 46 is suitably bonded. Sheets 46 and 48 are also sealed together along the side edges by means of a sealing strip indicated at 50 in FIG. 1 or alternatively, a plate indicated in phantom at 52 could be used to seal around the collector assembly 44 between upper sheet 46 and lower sheet 48. In any event, it is necessary to seal along the sides of absorber structure 44. The ends of absorber structure 44 are independently sealed by headers, one of which is indicated in FIG. 2 at 54. Header 54 is shown as being connected to output line 18 coming from pump 14 and a similar header (not shown) will be connected along the opposite end of the collector assembly 44 and will be connected to return line 16 leading from collector 10 back to the storage device 12.

As shown in FIG. 2, sheet 46 extends over and is sealed to and along the top of header 54 to assure that no leaks of the transfer medium will occur. Depending upon the type of insulation being used along the bottom 24 of the outer housing 22, it may or may not be necessary to provide additional support for bottom sheet 48. If such support is needed or desired, a support sheet indicated at 56 can be included and as shown in FIG. 2, sheet 56 will extend along the seal to the bottom of header 54. Alternatively, the end of bottom sheet 48 will be suitably secured as by adhesives, to the front surface or wall, 58 of headers 54.

Accordingly, regardless of whether the additional support plate 56 is being used, it is important to seal the chambers defined between sheets 46 and 48 of absorber assembly 44. More specifically, the header is provided with outlet openings, as indicated at 60, which, as shown, will open out into the flow path defined between support ribs 62 molded into bottom sheet 48. An alternative construction would include the construction of protuberances indicated in phantom at 64 which could be formed during the molding of bottom sheet 48 in lieu of support ribs 62. Regardless, however, there will be a chamber area formed between sheets 46 and 48 which will be bonded or otherwise sealed together to define one or more chambers into which fluid can flow via apertures 60 from header 54 and it is that area, defined between sheets 46 and 48, that must be sealed with respect to the front surface 58 of headers 54.

As shown in FIGS. 2 and 3, if support ribs 62 are employed, they will extend parallel to the end walls of the collection structure and are substantially perpendicular to the sides of the structure. Accordingly, they extend across the width of the structure and will define flow paths for the medium therebetween. In order to assure the most effective heat transfer possible, a plurality of shallow grooves indicated at 66 are provided along each of these flow paths in order to provide some degree of turbulence to the transfer medium as it flows therealong.

For protuberances 64 or support ribs 62, preferably range in height from about 1/16th of an inch to about ⅛th of an inch and a sufficient number will be provided in order to adequately support the thin metal sheet 46. The grooves 66 will have a depth preferably less than half of the height of ribs 62 or protuberances 64 and need to be only deep enough to provide some degree of turbulence to the transfer medium as it flows thereover.

The size of the collector can vary and I have found that a collector having from 20 to 40 square feet surface area is a convenient size. In addition, collector structures as described above can be used singly or can be combined with other similar collectors or stacked in order to produce maximum results. In addition, the collector structures can be mounted in any desired way or angle, or for that matter can be rotated in order to follow the sun as it moves during daylight hours.

One way to compute the effectiveness of the collector is to compute the heat conductivity from the upper surface of the absorber sheet 46 to the bottom surface of absorber sheet 46 and then directly to the fluid within the chamber or chambers defined between sheets 46 and 48. One formula for determining the amount of such conductivity is:

$$Q = K(t_1 - t_2)aT/d$$

where;

Q = quantity of heat in calories
k = a constant, 1 for copper and silver, 0.3 for brass
$t_1$ = temperature of the top surface of sheet 46
$t_2$ = temperature of the absorbing liquid flowing beneath sheet 46
a = area
T = time
d = Thickness of sheet 46

It is clear from this formula that the conductivity is inversely related to the thickness of sheet 46 as well as the type of material used for its construction.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims, which scope is to be accorded the broadest interpretation so as to encompass all such modifications and equivalent structures.

What I claim is:

1. A solar collector for collecting solar energy from the sun and exchanging that energy to a liquid heat exchange medium comprising an outer housing having side, end and bottom walls, insulation means for insulating the side, end and bottom walls, a closed medium chamber assembly consisting of spaced apart upper and lower sheets enclosed by said side and end walls, and header means positioned on opposite sides of said closed medium chamber assembly for directing the liquid heat exchange medium to and from said closed medium chamber assembly, respectively, pump means for circulating said liquid heat exchange medium to and from said header means and through said closed medium chamber assembly under a predetermined pressure, wherein said upper sheet consists of a thin metal sheet about 1/64th of an inch thick and said lower sheet consists of a thin plastic sheet which includes a plurality of spaced apart rib means extending upwardly from and along the surface of said lower sheet from one side to the other for supporting said upper sheet and for defining between the metal and plastic sheets a plurality of flow paths for the medium through said closed medium chamber assembly, said rib means having a height that can vary from about 1/16th of an inch to about ¼th of an inch, said lower sheet further including means for defining a plurality of shallow, downwardly directed grooves extending between said rib means and normally thereto and across the bottom of each of said plurality of flow paths.

2. A solar collector as in claim 1 further including at least one transparent panel retained within said side and end walls and spaced above said closed medium chamber assembly.

3. A solar collector as in claim 2, wherein said plurality of grooves extend perpendicularly to the flow path of said liquid heat exchange medium.

4. A solar collector as in claim 3 further including temperature sensing means for monitoring and indicating the temperature within said solar collector.

5. A solar collector as in claim 4 further including means for storing a predetermined quantity of said liquid heat exchange medium and wherein said circulation means circulates said liquid heat exchange medium between said storing means and said solar collector when temperatures within said solar collector are above a predetermined temperature.

6. A solar collector as in claim 2, wherein said solar collector includes a pair of spaced apart transparent panels.

7. A solar collector as in claim 1, wherein said upper sheet comprises steel.

8. A solar collector as in claim 1, wherein said upper sheet comprises copper.

9. A solar collector as in claim 1, wherein the exterior surface of said upper surface is coated with a dark, energy absorbing color.

10. A solar collector as in claim 9, wherein said lower sheet comprises a plastic material.

11. A solar collector as in claim 10, wherein said upper and lower sheets are bonded together at least along the side edges thereof.

12. A solar collector as in claim 1, wherein said plurality of grooves each have a depth less than one half the height of said rib means.

* * * * *